United States Patent
Werner et al.

(10) Patent No.: US 11,938,861 B2
(45) Date of Patent: Mar. 26, 2024

(54) REMOTE LIGHTING SYSTEM AND METHODS OF OPERATING SAME

(71) Applicant: Third Eye Design, Inc., Pittsford, NY (US)

(72) Inventors: David R. Werner, Pittsford, NY (US); David Zima, Sorrento, FL (US)

(73) Assignee: Third Eye Design, Inc., Pittsford, NY (US)

( * ) Notice: Subject to any disclaimer, the term of this patent is extended or adjusted under 35 U.S.C. 154(b) by 231 days.

(21) Appl. No.: 17/616,130

(22) PCT Filed: Jun. 2, 2020

(86) PCT No.: PCT/US2020/035760
§ 371 (c)(1),
(2) Date: Dec. 2, 2021

(87) PCT Pub. No.: WO2020/247395
PCT Pub. Date: Dec. 10, 2020

(65) Prior Publication Data
US 2022/0242304 A1 Aug. 4, 2022

Related U.S. Application Data

(60) Provisional application No. 62/856,222, filed on Jun. 3, 2019.

(51) Int. Cl.
*B60Q 1/26* (2006.01)
*A42B 3/04* (2006.01)
(Continued)

(52) U.S. Cl.
CPC .......... *B60Q 1/2676* (2013.01); *A42B 3/0453* (2013.01); *B60Q 1/381* (2022.05); *B60Q 1/44* (2013.01); *B60Q 2900/30* (2013.01)

(58) Field of Classification Search
CPC ........ B60Q 1/2676; B60Q 1/381; B60Q 1/44; B60Q 2900/30; B60Q 1/2649; A42B 3/0453; B60Y 2200/12; B60Y 2400/304
See application file for complete search history.

(56) References Cited

U.S. PATENT DOCUMENTS 5,537,092 A * 7/1996 Suzuki .................. A42B 3/042
340/432
6,157,298 A * 12/2000 Garfinkel ............. A42B 3/0466
340/463
(Continued)

FOREIGN PATENT DOCUMENTS

WO 2018222961 A1 6/2018

OTHER PUBLICATIONS

International Search Report of PCT Appl. No. US2018/035547 dated Oct. 5, 2020. EFS file name 20220627_17-6161130_IDS_NPL_Cite1.
(Continued)

*Primary Examiner* — Curtis J King
(74) *Attorney, Agent, or Firm* — John M. Hammond; Patent Innovations LLC (57) ABSTRACT

An auxiliary lighting system for a helmet operable with a lighting system of a vehicle comprising a vehicle brake light, comprised of a helmet portion and a vehicle portion. The helmet portion is comprised of a helmet lighting unit, a microcontroller in communication with the helmet brake light, and a helmet transceiver in communication with the microcontroller. The vehicle portion is comprised of a supporting body, a vehicle transceiver, and an accelerometer joined to the supporting body and in communication with the microcontroller. The microcontroller is programmed with an algorithm such that the microcontroller receives a signal indicative of the relative position of the accelerometer, determines the performance capability of the acceler-
(Continued)

ometer in detecting acceleration of the vehicle with respect to the Earth based upon the signal indicative of the position of the accelerometer, and presents an indication of accelerometer performance capability.

9 Claims, 6 Drawing Sheets (51) Int. Cl.
  *B60Q 1/38* (2006.01)
  *B60Q 1/44* (2006.01)

(56) References Cited

U.S. PATENT DOCUMENTS

| | | | | |
|---|---|---|---|---|
| 6,406,168 | B1* | 6/2002 | Whiting | B60Q 1/2676 362/802 |
| 6,784,795 | B1* | 8/2004 | Pories | B60Q 1/2676 455/39 |
| 7,857,479 | B1* | 12/2010 | Marroquin | B60Q 1/2676 340/479 |
| 7,948,367 | B1* | 5/2011 | Arauza | A42B 3/0453 340/475 |
| 8,941,482 | B1 | 1/2015 | Gouverneur | |
| 9,096,174 | B1* | 8/2015 | Banks | B60Q 1/343 |
| 10,624,400 | B1* | 4/2020 | Shrouder | B60Q 5/006 |
| 10,696,212 | B2* | 6/2020 | Cook | B62K 23/06 |
| 11,299,090 | B2 | 4/2022 | Werner et al. | |
| 11,325,527 | B2* | 5/2022 | Cook | B62J 6/056 |
| 2004/0227646 | A1* | 11/2004 | Henry | B62J 6/26 340/463 |
| 2005/0162265 | A1* | 7/2005 | Werner | B60Q 1/305 340/539.1 |
| 2005/0275193 | A1* | 12/2005 | Lee | B60Q 1/2673 280/468 |
| 2006/0174687 | A1 | 8/2006 | Autor | |
| 2006/0238877 | A1* | 10/2006 | Ashkenazi | G02B 27/017 359/630 |
| 2007/0147027 | A1* | 6/2007 | Chuang | A42B 3/0453 362/106 |
| 2007/0285221 | A1* | 12/2007 | Howe | B60Q 1/2676 340/479 |
| 2009/0140847 | A1* | 6/2009 | Yen | B62J 6/165 340/432 |
| 2010/0102947 | A1* | 4/2010 | Chen | B60Q 1/302 340/479 |
| 2010/0134272 | A1* | 6/2010 | Palacios | B60Q 1/2676 340/475 |
| 2010/0139995 | A1* | 6/2010 | Rudakevych | B62D 55/06 180/9.32 |
| 2010/0207758 | A1* | 8/2010 | Szeljack | A42B 3/0453 340/475 |
| 2010/0253501 | A1* | 10/2010 | Gibson | A41D 13/01 340/475 |
| 2013/0093585 | A1* | 4/2013 | Ambani | B62J 6/045 340/475 |
| 2013/0307678 | A1* | 11/2013 | Ransom | B62J 6/056 340/474 |
| 2014/0104055 | A1* | 4/2014 | Boutte | A42B 3/0453 340/468 |
| 2014/0210609 | A1* | 7/2014 | Yang | B60Q 1/2676 340/463 |
| 2015/0250247 | A1* | 9/2015 | Beckers | A42B 3/044 362/103 |
| 2016/0144773 | A1* | 5/2016 | Alataas | B60Q 1/44 340/475 |
| 2016/0185280 | A1* | 6/2016 | Coles | B62J 6/056 340/432 |
| 2016/0192866 | A1* | 7/2016 | Norstrom | A63B 24/0006 434/247 |
| 2016/0309826 | A1* | 10/2016 | Anderson | A42B 3/0453 |
| 2017/0066492 | A1* | 3/2017 | Arkhangelskiy | B60Q 1/0023 |
| 2017/0072840 | A1* | 3/2017 | MossadeghPour | G01C 21/265 |
| 2017/0253175 | A1* | 9/2017 | Zhang | B60Q 1/44 |
| 2017/0257934 | A1* | 9/2017 | Garvey | G08G 1/162 |
| 2018/0009372 | A1 | 1/2018 | Hammock | |
| 2018/0201181 | A1* | 7/2018 | Cook | B62L 3/02 |
| 2018/0272928 | A1* | 9/2018 | Boksteyn | A42B 3/0453 |
| 2018/0354442 | A1* | 12/2018 | Bergstrom | B60R 1/06 |
| 2019/0184892 | A1* | 6/2019 | McCormack | B60Q 1/2607 |
| 2019/0248275 | A1* | 8/2019 | Cook | B62J 6/056 |
| 2020/0055443 | A1* | 2/2020 | Ehrmann | A42B 3/0433 |
| 2021/0065467 | A1* | 3/2021 | Allinger | G07C 5/006 |
| 2021/0088297 | A1* | 3/2021 | Henry | F41A 17/063 |
| 2021/0138956 | A1* | 5/2021 | Werner | B60Q 1/46 |
| 2021/0315289 | A1* | 10/2021 | Watson | F21V 33/0008 |
| 2022/0151328 | A1* | 5/2022 | Van Cleve | A42B 3/30 |
| 2022/0242304 | A1* | 8/2022 | Werner | B60Q 1/381 |
| 2023/0082081 | A1* | 3/2023 | Troxler | B60Q 1/2673 |

OTHER PUBLICATIONS

Written Opinion of PCT Appl. No. US2018/035547 dated Oct. 5, 2020. EFS file name 20220627_17-6161130_IDS_NPL_Cite2.

* cited by examiner

REMOTE LIGHTING SYSTEM AND METHODS OF OPERATING SAME

CROSS-REFERENCE TO RELATED PATENT APPLICATIONS

This application claims the benefit of U.S. Provisional Patent Application No. 62/856,222 filed Jun. 3, 2019, the disclosure of which is incorporated herein by reference.

BACKGROUND

Technical Field

Remote lighting that is operable to coincide with corresponding lighting on a vehicle, and methods of operating the lighting. In particular, a lighting system, which is attachable to a safety helmet, and which is operable to correspond with lighting on a powersport vehicle such as a motorcycle; and methods of use thereof.

Background Art

Motorcycle and powersport riding is a necessary means of transportation for some, and an enjoyable pastime for others. Regardless of whether powersport riding is done of necessity, or as an avocation, it is a dangerous means of transportation.

One of the major risks in motorcycle riding is the risk of a rear-end or side collision, i.e., the risk to the motorcycle rider being struck from the rear or side by another vehicle. Additionally, a motorcycle typically includes only a single array of running, brake, and signal lights mounted at only about two to three feet above ground level. This is in comparison to passenger car and truck lighting, provided in separated left/right pairs typically at three to four feet above ground level, and usually augmented by a Center High Mounted Stop Lamp (CHMSL), which is mandatory by law on passenger vehicles manufactured since 1986.

Attempts have been made to increase the visibility of a motorcycle and rider by providing a remotely operated auxiliary light or lighting system that can be worn by the rider of the motorcycle, typically mounted on the back of the safety helmet of the rider. For example, commonly owned U.S. Pat. No. 7,218,214 of Werner et al., the disclosure of which is incorporated herein by reference, discloses an auxiliary safety lighting system that is remotely operated by wireless H-field backscatter signal communication. Other patents and published patent applications also disclose remotely operated lighting. Additionally, some motorcycle helmet remote lighting products have been introduced into the commercial marketplace.

Obtaining mass-market acceptance of a new product is challenging. In today's "connected" world, customers want simplicity and versatility, instantly, in the products that they purchase, including the purchase of an auxiliary remote lighting system for a motorcycle helmet. A key customer need in such a system is that it is compatible with the particular motorcycle that they own, and that it is easy to install the system components on their motorcycle and helmet. The installation procedure should require a minimum of mechanical and electrical skills.

Concurrent with that need is the strong preference that a single auxiliary remote lighting system be provided which is easily adapted to the vast majority of motorcycles that are currently in use today. This is desirable in order to manufacture such a system in high volumes, so that manufacturing cost is low enough to enable a retail purchase price that motorcycle riders are willing to pay. If a lighting system manufacturer had to make a separate unit for every make and model of motorcycle on the road, the logistics of such an endeavor would be daunting, and the manufacturing cost of the individual products would likely be too high to succeed in the marketplace.

Customers also want "smart" devices, i.e., devices that have built-in intelligence capabilities that provide advantages that were previously not possible in simple analog devices. As applied to an auxiliary remote lighting system for a motorcycle helmet, customers want additional safety features and attributes in the system. A customer also wants a lighting system that adapts to how he/she sets it up on his/her motorcycle.

SUMMARY

In accordance with the present disclosure, auxiliary lighting systems for a helmet operable in conjunction with a lighting system of a vehicle, and methods of use of such systems are provided, which meet the aforementioned needs.

In one aspect of the present disclosure, a first auxiliary lighting system is provided for a helmet operable in conjunction with a lighting system of a vehicle comprising a vehicle brake light. The auxiliary lighting system is comprised of a helmet portion and a vehicle portion.

The helmet portion is comprised of a helmet electrical power supply; a helmet lighting unit connected to the power supply and comprising a helmet brake light, a microcontroller connected to the power supply and in signal communication with the helmet brake light, and a helmet transceiver in signal communication with the microcontroller. The vehicle portion is comprised of a vehicle portion supporting body mountable on the vehicle, a vehicle transceiver in wireless signal communication with the helmet transceiver, and a vehicle accelerometer joined to the vehicle portion supporting body and in signal communication with the microcontroller. The vehicle transceiver may be joined to the supporting body The vehicle accelerometer is operable to send a signal indicative of relative position of the accelerometer with respect to the gravitational field of the Earth.

The microcontroller is programmed with an algorithm such that when executed, the microcontroller receives the signal indicative of the relative position of the accelerometer, determines the performance capability of the accelerometer in detecting acceleration of the vehicle with respect to the Earth based upon the signal indicative of the relative position of the accelerometer, and presents an indication of the performance capability of the accelerometer to a user of the auxiliary lighting system.

The vehicle portion of the system may be further comprised of a vehicle accelerometer performance indicator. In such instances, the indication of the performance capability of the vehicle accelerometer may be presented on the vehicle accelerometer performance indicator. Alternatively, the vehicle accelerometer performance indicator may be presented virtually to a user by a display screen of a mobile device.

The helmet portion may be further comprised of a helmet portion supporting body and a helmet accelerometer joined to the helmet portion supporting body and in signal communication with the microcontroller. The helmet accelerometer is operable to send a signal indicative of an upward position of the helmet portion supporting body or a downward position of the helmet portion supporting body relative to the helmet. In one instance, the microcontroller may be programmed with an algorithm such that when executed, the microcontroller receives the signal indicative of an upward or downward position of the helmet portion supporting body relative the helmet. If the helmet portion supporting body is in the upward position, the algorithm instructs the microcontroller to cause a first helmet signal light of the helmet lighting unit to be illuminated when the vehicle left signal light is illuminated and to cause a second helmet signal light of the helmet lighting unit to be illuminated when the vehicle right signal light is illuminated. If the helmet portion supporting body is in the downward position, the algorithm instructs the microcontroller to cause the first helmet signal light to be illuminated when the vehicle right signal light is illuminated and to cause the second helmet signal light to be illuminated when the vehicle left signal light is illuminated. In another instance, the microcontroller may be programmed with an algorithm such that when executed, the microcontroller receives the signal indicative of the position of the helmet portion supporting body relative the helmet, and if the helmet portion supporting body is in the downward position, the algorithm instructs the microcontroller to operate an alarm device of the helmet portion of the system.

In another aspect of the present disclosure, a first method of installing an auxiliary lighting system for a helmet operable in conjunction with a lighting system of a vehicle comprising a vehicle brake light is provided. The auxiliary lighting system may be comprised of a helmet light portion and a vehicle light portion. The helmet light portion may include a helmet lighting unit comprised of a brake light, a microcontroller in signal communication with the helmet brake light, and a helmet transceiver in signal communication with the microcontroller. The vehicle portion may include a vehicle portion supporting body, a vehicle transceiver in wireless signal communication with the helmet transceiver, and a vehicle accelerometer joined to the vehicle portion supporting body and in signal communication with the microcontroller. The vehicle accelerometer is operable to send a signal indicative of the relative position of the vehicle portion supporting body with respect to the gravitational field of the Earth.

For such a lighting system, the method comprises mounting the vehicle portion supporting body on the vehicle, and based upon the signal from the vehicle accelerometer, determining the performance capability of the accelerometer in detecting acceleration of the vehicle with respect to the Earth. The method may further comprise presenting an indication of the performance capability of the accelerometer to a user of the auxiliary lighting system. The method may further comprise rotating the vehicle and the vehicle portion of the system, detecting the rotation with the vehicle accelerometer, delivering a signal representative of the rotation from the accelerometer to the microcontroller, and based upon that signal, improving the performance capability of the accelerometer.

In another aspect of the present disclosure, a second auxiliary lighting system is provided for a helmet operable in conjunction with a lighting system of a vehicle comprising a vehicle left signal light and a vehicle right signal light. The auxiliary lighting system is comprised of a helmet portion comprising a helmet portion supporting body, a helmet lighting unit, a microcontroller, and a helmet accelerometer. The helmet lighting unit is mounted on the helmet portion supporting body and is comprised of a first helmet signal light and a second helmet signal light. The microcontroller is in signal communication with the first helmet signal light and the second helmet signal light. The helmet accelerometer is joined to the helmet portion supporting body and is in signal communication with the microcontroller, and operable to send a signal to the microcontroller indicative of an upward position of the helmet portion supporting body or a downward position of the helmet portion supporting body relative to the helmet. The microcontroller is programmed with an algorithm such that when executed, if the signal from the accelerometer is indicative of an upward position of the helmet portion supporting body, the microcontroller causes the first helmet signal light to be illuminated when the vehicle left signal light is illuminated, and the microcontroller causes the second helmet signal light to be illuminated when the vehicle right signal light is illuminated.

The algorithm may include instructions such that when executed, if the signal from the accelerometer is indicative of a downward position of the helmet portion supporting body, the microcontroller causes the first helmet signal light to be illuminated when the vehicle right signal light is illuminated, and the microcontroller causes the second helmet signal light to be illuminated when the vehicle left signal light is illuminated. The algorithm may include instructions such that when executed, if the signal from the accelerometer is indicative of a downward position of the helmet portion supporting body, the algorithm instructs the microcontroller to operate an alarm device of the auxiliary lighting system. The auxiliary lighting system may be further comprised of a helmet transceiver in signal communication with the microcontroller, and a vehicle portion comprised of a vehicle transceiver in wireless signal communication with the helmet transceiver.

In another aspect of the present disclosure, a second method of installing an auxiliary lighting system for a helmet operable in conjunction with a lighting system of a vehicle comprising a vehicle left signal light and a vehicle right signal light is provided. The auxiliary lighting system may be comprised of a helmet light portion comprising a helmet lighting unit comprised of a helmet portion supporting body, a first helmet signal light and a second helmet signal light mounted on the helmet portion supporting body, a microcontroller in signal communication with the first helmet signal light and the second helmet signal light, a helmet transceiver in signal communication with the microcontroller, and a helmet accelerometer joined to the helmet portion supporting body and in signal communication with the microcontroller. The helmet accelerometer is operable to send a signal indicative of an upward position of the helmet portion supporting body or a downward position of the helmet portion supporting body relative to the helmet.

For such a lighting system, the method comprises mounting the helmet portion supporting body on the helmet; and based upon a signal from the helmet accelerometer, detecting if the helmet portion supporting body is in the upward position or the downward position. If the helmet portion supporting body is detected to be in the upward position, the method may further comprise causing the first helmet signal light to be illuminated when the vehicle left signal light is illuminated and causing the second helmet signal light to be illuminated when the vehicle right signal light is illuminated. If the helmet portion supporting body is detected to be in the downward position, the method may further comprise causing the first helmet signal light to be illuminated when the vehicle right signal light is illuminated and causing the second helmet signal light to be illuminated when the vehicle left signal light is illuminated. Alternatively, if the helmet portion supporting body is detected to be in the downward position, the method may further comprise operating an alarm device of the auxiliary lighting system.

BRIEF DESCRIPTION OF THE DRAWINGS

The present disclosure will be provided with reference to the following drawings, in which like numerals refer to like elements, and in which.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

BEST MODE FOR CARRYING OUT THE INVENTION

For a general understanding of the present disclosure, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

Lighting systems of the present disclosure are described in the context of their use as a remote lighting system, any of which can be embedded in or joined to a motorcycle helmet, and which include lighting elements that are operable to correspond with respective lighting elements on the motorcycle. However, any remote lighting system of the present disclosure is not to be construed as being limited only to use on a motorcycle helmet. The remote lighting system might be worn elsewhere on a rider, such as on a jacket of the rider beneath the neck area. Additionally, the remote lighting system and methods of use thereof are applicable to other vehicles, and in particular, "powersport" vehicles. As used herein, the term "powersport vehicle" includes, but is not limited to, motorcycles, scooters, all-terrain vehicles (ATVs), personal watercraft ("jet skis"), and snowmobiles.

Additionally, the remote lighting system is adaptable to any use in which remote lighting is desirable to be provided in a manner that corresponds to primary lighting on an object. With regard to vehicular applications, the remote lighting system is also adaptable to vehicle towing applications. A vehicle that is being towed, such as an inoperative automobile, or a trailer that lacks its own lighting, can have the remote lighting system of the present disclosure temporarily attached thereto, and rendered more visible for safer towing.

Additionally, the description provided herein may identify certain components with the adjectives "top," "upper," "bottom," "lower," "left," "right," etc. These adjectives are provided context of use of the remote lighting system on a safety helmet, and in the context of the orientation of the drawings. The description is not to be construed as limiting the remote lighting system to use in a particular spatial orientation unless noted otherwise. The instant system may be used in orientations other than those shown and described herein.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

The term "providing," such as "providing a helmet" and the like, if recited in the claims, is not intended to require any particular delivery or receipt of the provided item. Rather, the term "providing" is merely used to recite items that will be referred to in subsequent elements of the claim(s), for purposes of clarity and ease of readability.

Figure 1:
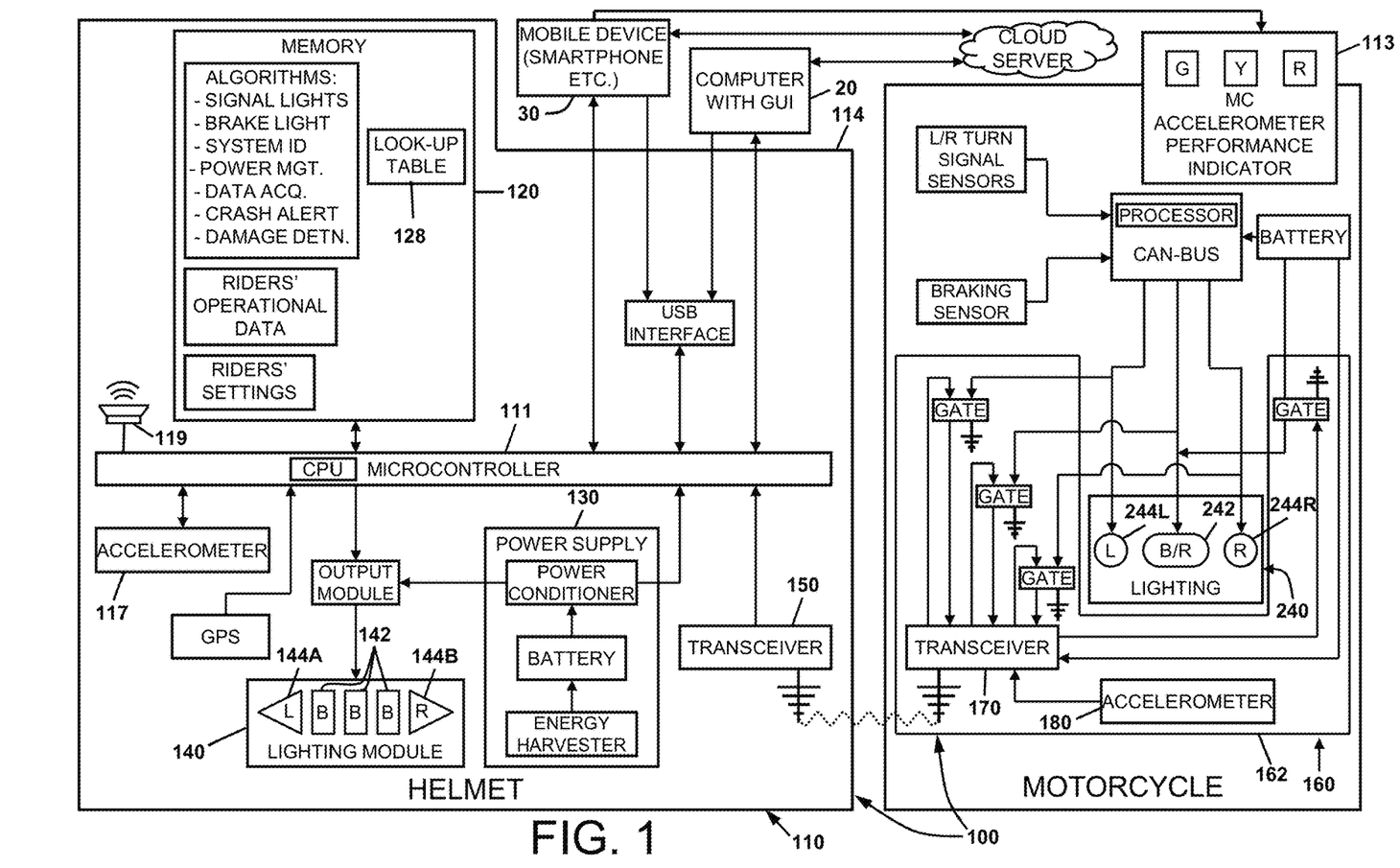
FIG. 1 is a block diagram of an exemplary helmet safety lighting system of the present disclosure.

FIG. 1 is a block diagram of an exemplary helmet safety lighting system of the present disclosure. The system 100 is depicted in the drawings and will now be described in use with a motorcycle as an exemplary vehicle for use with the system 100. The system of FIG. 1 is similar to the system of FIG. 3B as shown in commonly owned PCT Application No. US2018/035547 (the "547 application"), the disclosure of which is incorporated herein by reference. Other helmet safety lighting systems may be adapted to be operable as systems in accordance with the present disclosure, including the systems depicted in FIG. 3A and FIG. 3C of the '547 application and described therein.

Referring to FIG. 1, the auxiliary lighting system 100 is comprised of a helmet portion 110 and a vehicle portion 160. The helmet portion 110 is comprised of a helmet electrical power supply 130; a helmet lighting unit 140 connected to the power supply 130 and comprising a helmet brake light 142; and a microcontroller 111 connected to the power supply 130 and in signal communication with the brake light 142 through a helmet transceiver 150. The helmet portion 110 may be further comprised of a first helmet signal light 144A and a second helmet signal light 144B in signal communication with the microcontroller 111. The vehicle portion 160 is comprised of a vehicle portion supporting body 162 mountable on the vehicle (e.g., motorcycle 10 of FIG. 2), a vehicle transceiver 170 joined to the supporting body 162 and in wireless signal communication with the helmet transceiver 150, and a vehicle accelerometer 180 joined to the vehicle portion supporting body 162 and in signal communication with the transceiver 170. The vehicle portion supporting body 162 that is mountable on the vehicle may be a rigid printed circuit board, to which the vehicle transceiver 170 and vehicle accelerometer 180 are joined. Alternatively, the vehicle portion supporting body 162 may be a rigid block of material, within which the vehicle transceiver 170 and vehicle accelerometer 180 are potted or embedded. Alternatively, vehicle portion supporting body 162 may be a rigid plate of material, upon which the vehicle transceiver 170 and vehicle accelerometer 180 are mounted. In other instances of the system 100 (not shown), the microcontroller 111 of the helmet portion 110 may be provided as a component on the vehicle portion 160, with the wireless communication between the vehicle portion 160 and the helmet portion 110 adapted accordingly so that the lights 142, 144A, and 1446 on the helmet portion 110 are operable as described herein.

In development of the lighting system 100, it has been discovered that there is a wide variability in the choice of where to mount the supporting body 162 of the vehicle portion 160, i.e. the motorcycle portion 160, of the lighting system. One reason for this is that there is wide variability in the structure of motorcycles, and accordingly, wide variability in motorcycle portion mounting locations. Another reason is that two customers might have the same make and model of motorcycle, but choose to install their respective motorcycle portions 160 on their motorcycles differently. This variety of possible mounting locations notwithstanding, it is desirable that a customer cannot set up a lighting system incorrectly, such that it is inoperable.

Figure 2:
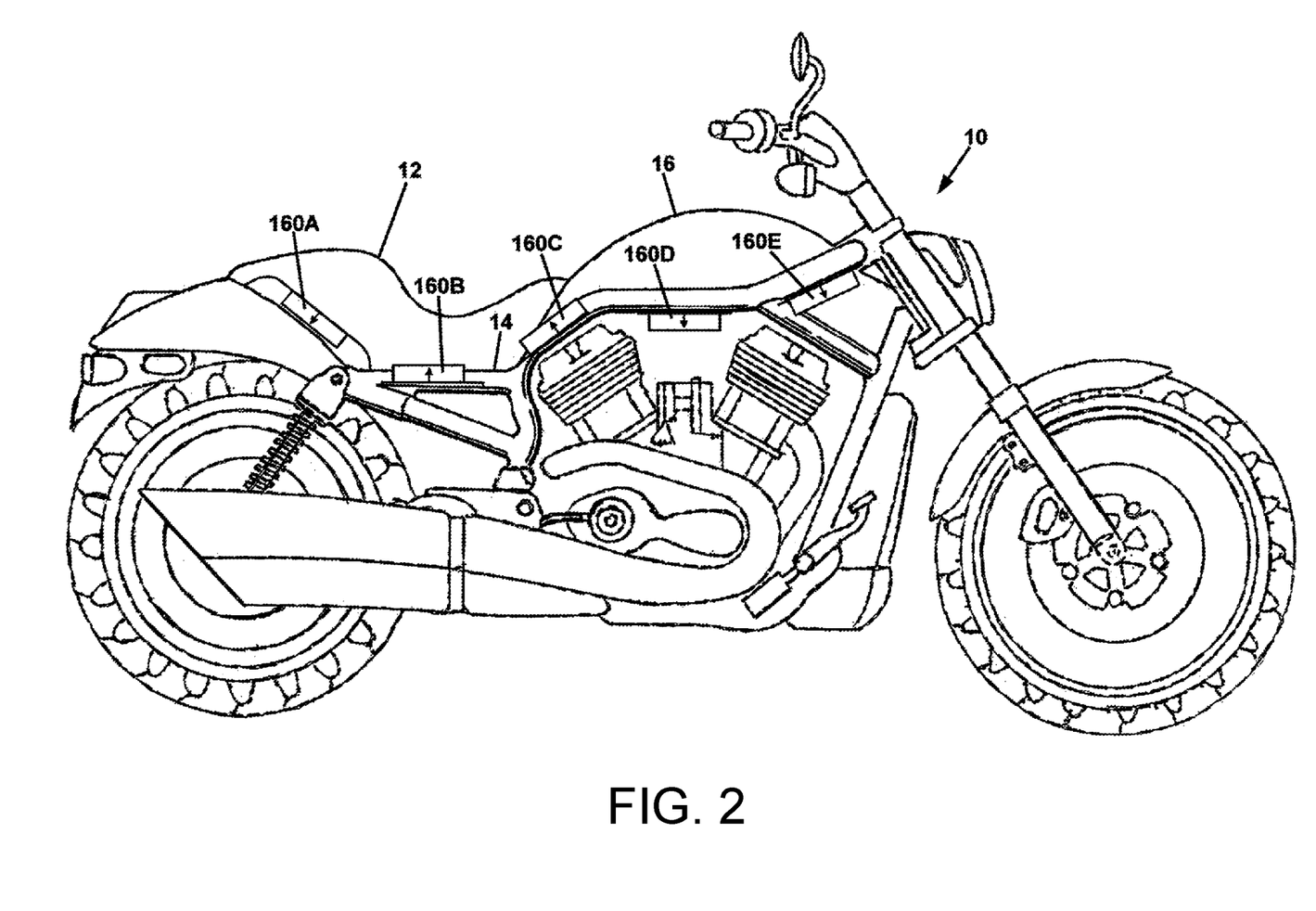
FIG. 2 is a schematic illustration of exemplary mounting locations and orientations of a motorcycle portion of the lighting system upon a motorcycle.

FIG. 2 is a schematic illustration of some exemplary mounting locations and orientations of a motorcycle portion of the lighting system 100 upon a motorcycle 10. Motorcycle portion 160A is mounted to and beneath the rear section of the seat 12. Motorcycle portion 160B is mounted to the motorcycle frame 14 beneath the center section of the seat 12. Motorcycle portion 160C is mounted to the motorcycle frame 14 beneath the rearward section of the gas tank 16. Motorcycle portion 160D is mounted to the underside of the motorcycle frame 14 beneath the center section of the gas tank 16. Motorcycle portion 160E is mounted to the underside of the motorcycle frame 14 beneath the forward section of the gas tank 16. Each of the motorcycle portions 160A-160E has an arrow indicating a relative orientation. Motorcycle portions 160B and 160C have a relative upward orientation, and motorcycle portions 160A, 160D, and 160E have a relative downward orientation. Other mounting arrangements may be possible depending upon the structure of the particular motorcycle, including mounting on a substantially vertical surface, instead of the substantially horizontal surfaces shown in FIG. 2. It is not practical to manufacture customized lighting systems that are configured for each make and model of motorcycle on the market, and it is not possible to anticipate the variability in how customers will install the lighting system on their motorcycle.

Accordingly, it has been discovered that this wide variation in possible motorcycle portion mounting locations and orientations presents a problem. In providing a lighting system 100 of the present disclosure, the vehicle accelerometer 180 may be used to detect deceleration (i.e., negative acceleration), and under such circumstances, to deliver a signal to the microcontroller so that the brake light on the helmet light unit is illuminated, as disclosed in the aforementioned '547 application.

In using a typical accelerometer, it is assumed that the accelerometer will be rigidly mounted on a supporting body in a particular orientation with respect to the gravitational field of the Earth. This mounting arrangement is needed in order for the accelerometer to function optimally, or in some cases, to function properly in detecting acceleration of the object upon which it is mounted. The desired mounting position may be considered the accelerometer "default position."

In the lighting system 100 of the present disclosure, the accelerometer default position will occur if the supporting body 162 of the vehicle portion 160 (and the vehicle accelerometer 180) is mounted in an upward position such as for motorcycle portion 160B of FIG. 2. However, the problem arises if the vehicle portion 160 (and the vehicle accelerometer 180) is mounted in alternative positions such as for motorcycle portions 160A, 160C, 160D, or 160E of FIG. 2: in such circumstances, the signal indicative of the position of the relative vehicle portion supporting body and accelerometer 180 may no longer be correct and/or of sufficient strength to be useful in controlling the lighting unit 140 of the helmet portion 100. Accordingly, the performance capability of the motorcycle accelerometer 180 in detecting acceleration of the motorcycle may be compromised or rendered inoperative.

In one aspect of the present disclosure, the above problem may be solved by providing an accelerometer performance indicator 113, and choosing a satisfactory position of the vehicle portion supporting body 162 based upon the indication of the accelerometer performance indicator 113. The algorithm executed by the microcontroller 111 of the helmet portion 110 includes instructions to analyze the signal from the vehicle accelerometer 180 and determine if the signal is sufficient to be able to accurately determine acceleration of the motorcycle portion 160 of the system 100 (and therefore the acceleration of the motorcycle 10). The possible performance of the accelerometer 180 may be shown by the accelerometer performance indicator 113. Thus in setup of the motorcycle portion 160 of the system 100, a user may move the motorcycle portion supporting body 162 and accelerometer 180 to various possible mounting locations on the motorcycle 10, such as those shown in FIG. 2, and select a location based upon the indication from the accelerometer performance indicator 113.

In one case, the accelerometer performance indicator 113 may be mounted on the motorcycle portion supporting body 162. Such an accelerometer performance indicator 113 may be comprised of indicator lights, such as green, yellow, and red, indicating possible good, fair, and poor accelerometer performance. In another case, the accelerometer performance indicator 113 may be provided as an image on the display of a mobile device 30 that is in communication with the microcontroller 111. When the user moves the motorcycle portion supporting body 162 and accelerometer 180 to various possible mounting locations on the motorcycle 10, the accelerometer performance indicator 113 on the mobile device display may indicate the relative accelerometer performance.

In yet another case, a virtual model of a motorcycle 10 and the motorcycle portion 160 of the system 100 may be provided in software on the mobile device. The software on the mobile device is operable to enable a user to manipulate the virtual position of the motorcycle portion 160 of the system 100 on the motorcycle 10 via suitable input, i.e., a touch screen. Thus the user of the system may study the actual motorcycle 10, and select a possible desired location of the motorcycle portion supporting body 162 and accelerometer 180, and then manipulate the virtual position of the motorcycle portion 160 of the system 100 on the motorcycle in the virtual model to the corresponding possible desired location. The algorithm executed by the microcontroller 111 may include instructions to analyze a look-up table 128 stored in memory 120, which contains data on the signal from the vehicle accelerometer 180 as a function of position of the accelerometer 180. Thus the user can determine if the possible desired location will enable satisfactory accelerometer performance.

In another aspect of the present disclosure, the above problem may be solved by placing the system 100 in a "teaching" mode after mounting the motorcycle portion 160 of the system in a desired location on the motorcycle 10, and prior to using the lighting system 100 to operate the brake light 142 of the helmet lighting unit 140. This is best understood with reference to FIG. 3, which is a flowchart depicting a method 300 of installing an auxiliary lighting system for a helmet operable in conjunction with a lighting system of a vehicle. The method includes steps to optimize the performance of the vehicle accelerometer 180 based upon the orientation of the motorcycle portion 160 of the lighting system 100 mounted on the motorcycle 10.

Figure 3:
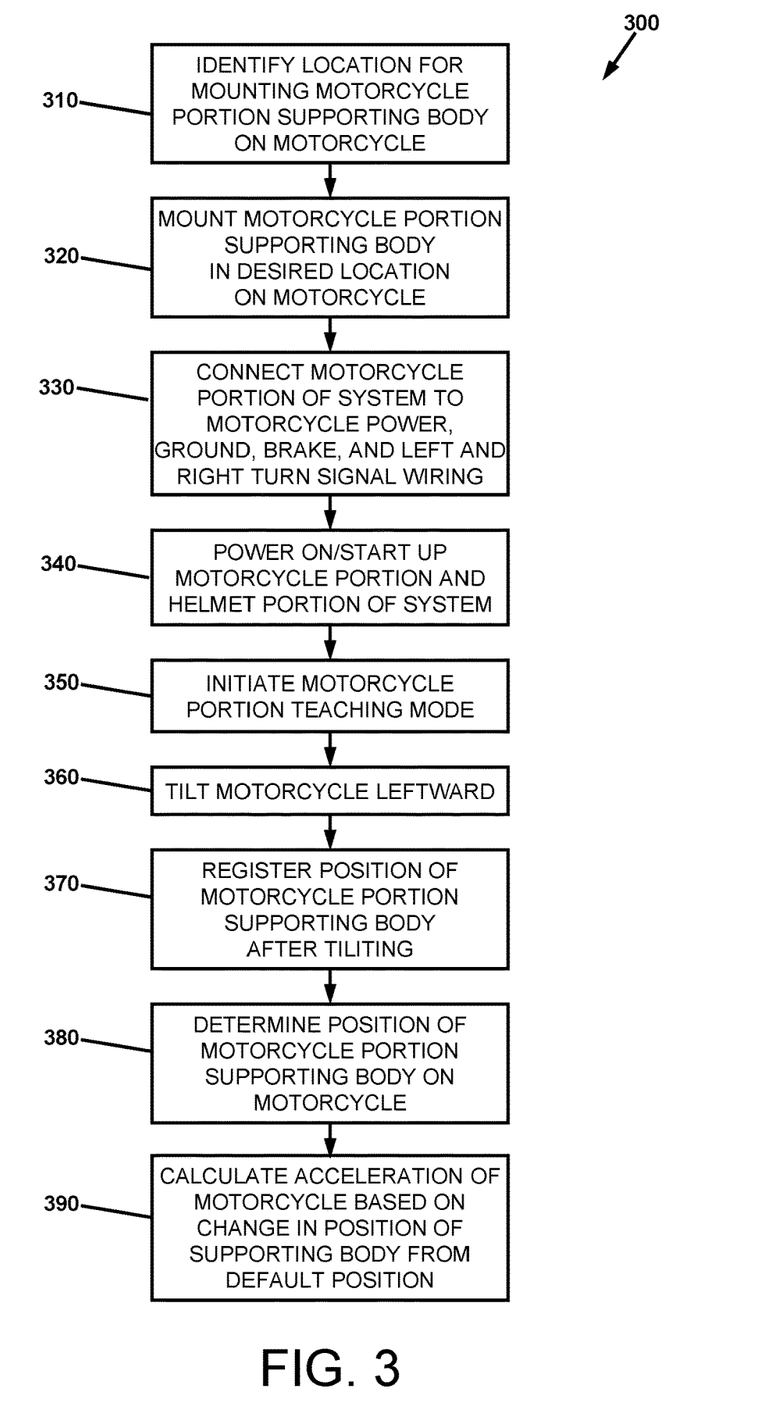
FIG. 3 is a flowchart depicting a method of installing an auxiliary lighting system for a helmet operable in conjunction with a lighting system of a vehicle, including optimizing performance of a vehicle accelerometer of the system.

The method 300 comprises identifying 310 a suitable location for mounting the motorcycle portion supporting body 162 on the motorcycle 10, and mounting 320 the supporting body 162 in that location. The motorcycle portion 160 of the system 100 is connected 330 to motorcycle power, ground, brake, and left and right turn signal wiring. The motorcycle portion 160 and helmet portion 110 of system 100 are then electrically powered 340.

Figure 4A:
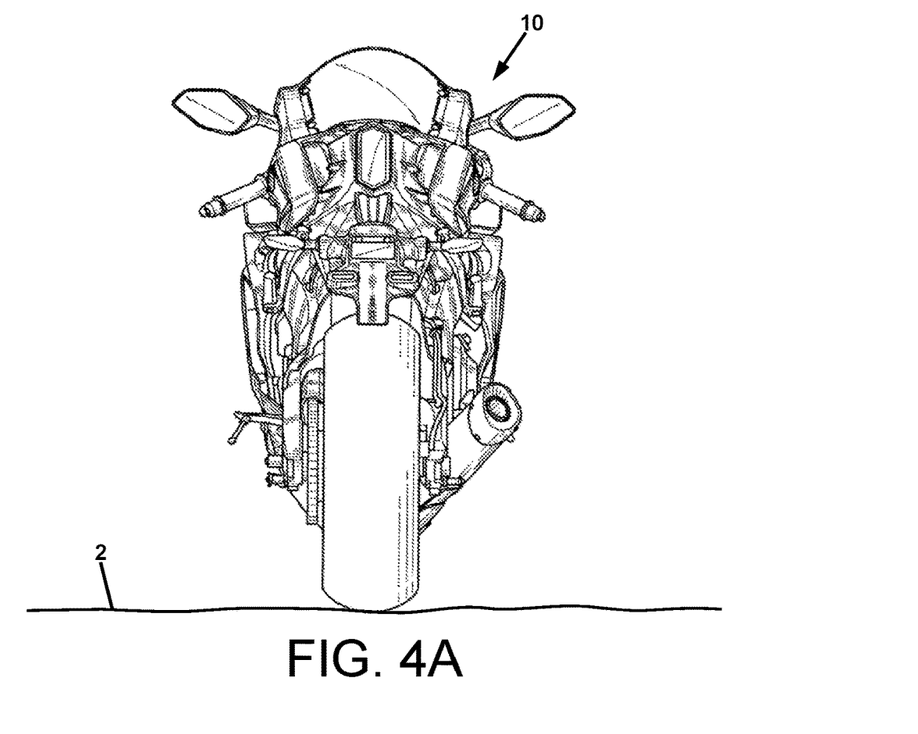
FIG. 4A is a rear elevation view of a motorcycle during an initial step of the method of FIG. 3.

With the motorcycle 10 preferably in a "neutral position," i.e. standing straight up relative to the earth 2 (and relative to its gravitational field) as shown in FIG. 4A, the motorcycle portion teaching mode is initiated 350. This may be done by executing a specific predetermined input to the system, such as by, e.g., applying power to the system 100. The microcontroller 111 is programmed to indicate that the system 100 is in teaching mode by outputting a communication, such as flashing the lights 142, 144A, and 144B of the lighting unit 140 four times in rapid succession, or issuing a series of rapid chirps from speaker 119 (e.g., less than one second dwell time between on/offs). Alternatively, if the system 100 is placed in communication with a mobile device 30, such as a smart phone, or in communication with a computer 20, the initiate teaching mode command may be entered via that device.

Figure 4B:
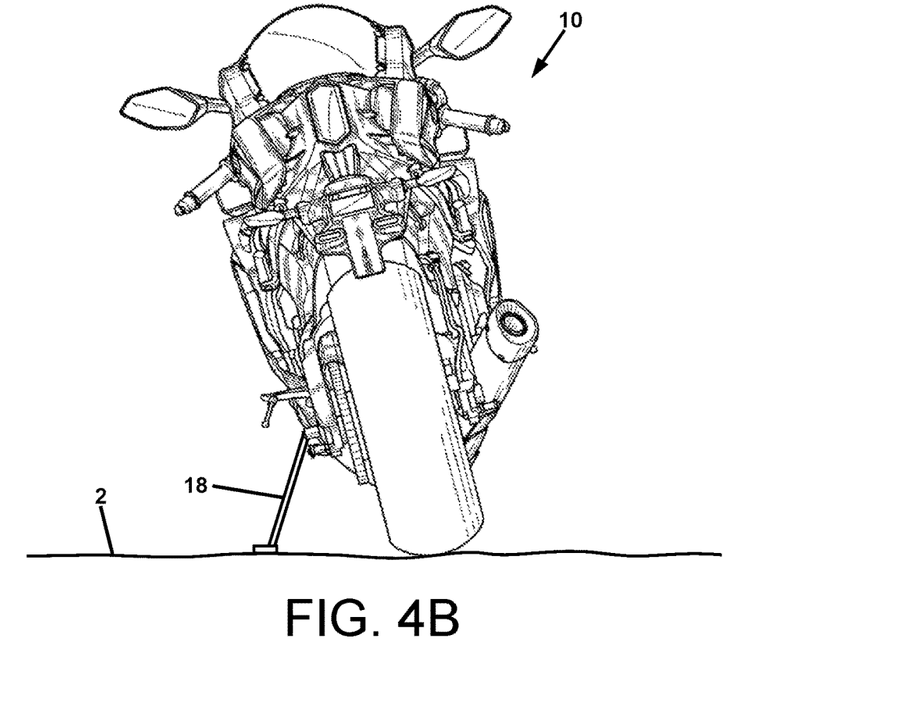
FIG. 4B is a rear elevation view of a motorcycle during a subsequent step of the method of FIG. 3.

Once the system 100 has been placed in teaching mode with the motorcycle 10 in a neutral position, the motorcycle 10 is tilted, i.e., rotated leftward 360 (as viewed from the rear of the motorcycle) as shown in FIG. 4B. In certain instances, a tilt of about 15 degrees leftward is sufficient, which conveniently, is a typical amount of tilt when the motorcycle 10 is resting upon a typical side kickstand 18. With the motorcycle 10 leaning leftward, the position of motorcycle portion supporting body 162 relative to the motorcycle 10 can be registered 370 based upon the signal from the vehicle accelerometer 180. According to the algorithm programmed into the microcontroller, with it known that the motorcycle is leaning leftward, the microcontroller 111 then executes instructions to determine 380 the position of the motorcycle position supporting body 162 and accelerometer 180 on the motorcycle. When the determination 380 has been made according to the algorithm, a second series of flashes of lighting unit 140 and/or chirps from speaker 119 may be issued, indicating that the teaching mode is completed. Subsequently, based upon that determination, when the system is in use, the algorithm further includes instructions to calculate 390 the acceleration of the motorcycle portion supporting body 162 (and the motorcycle 10), with the change in the position of the motorcycle position supporting body 162 and accelerometer 180 on the motorcycle 10 from the default position taken into account. It is to be understood that the algorithm may be based upon tilting the motorcycle in the rightward position, a forward position, or a rearward position. However, since most motorcycle kickstands allow the motorcycle to lean leftward in a stable position, a leftward lean in the algorithm is described herein as an exemplary case.

It is also to be understood that while the above method has been described with respect to a conventional two-wheeled motorcycle, it is also applicable to other vehicles including but not limited to three-wheel type motorcycles, inverted tricycle motorcycles (such as a Can-Am Spyder manufactured by BRP Inc. of Valcourt Quebec CA), motorcycles with side cars, snowmobiles, and jet skis. The method of tilting the vehicle leftward will vary as needed with its structure. For a jet ski, it may be titled leftward with respect to the surface of the water in which it may be floating instead of on solid ground or a trailer.

In another aspect of the present disclosure, an auxiliary lighting system for a helmet operable in conjunction with a lighting system of a vehicle comprising a vehicle left signal light and a vehicle right signal light is provided. Referring again to FIG. 1, the auxiliary lighting system 100 may be comprised of a helmet light portion 110 comprising a helmet lighting unit 140 comprised of a first helmet signal light 144A and a second helmet signal light 144B, a microcontroller 111 in signal communication with the first helmet signal light 144A and the second helmet signal light 144B, a helmet transceiver 150 in signal communication with the microcontroller 111, a helmet portion supporting body 114, and a helmet accelerometer 117 joined to the helmet portion supporting body 114 and in signal communication with the microcontroller 111. The helmet portion supporting body 114 may be a printed circuit board, a block of material, or a plate of material to which the helmet transceiver 150 and helmet accelerometer 117 are joined. The helmet accelerometer 117 is operable to send a signal indicative of a helmet portion supporting body 114 in an upward position or helmet portion supporting body 114 in a downward position relative to the helmet.

Figure 5A:
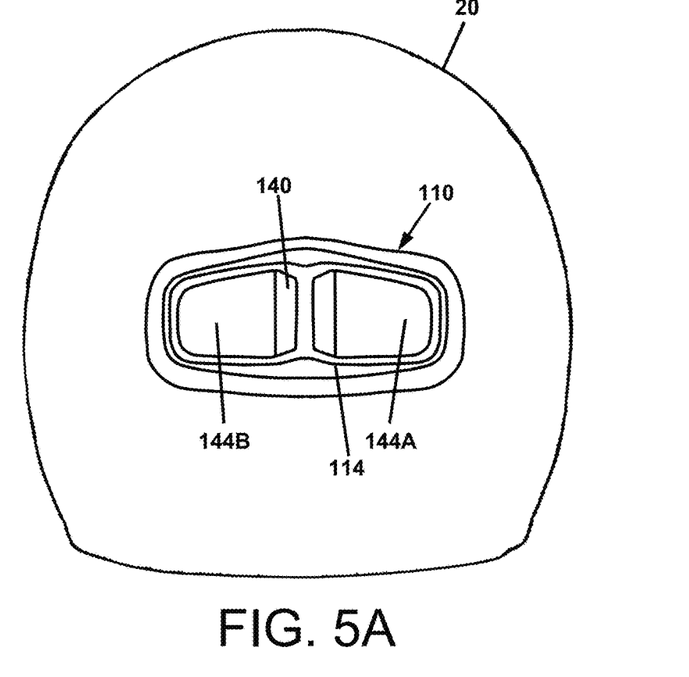
FIG. 5A is a rear elevation view of a safety helmet with the lighting system of the present disclosure mounted in an "downward" or "upside down" position.
Figure 5B:
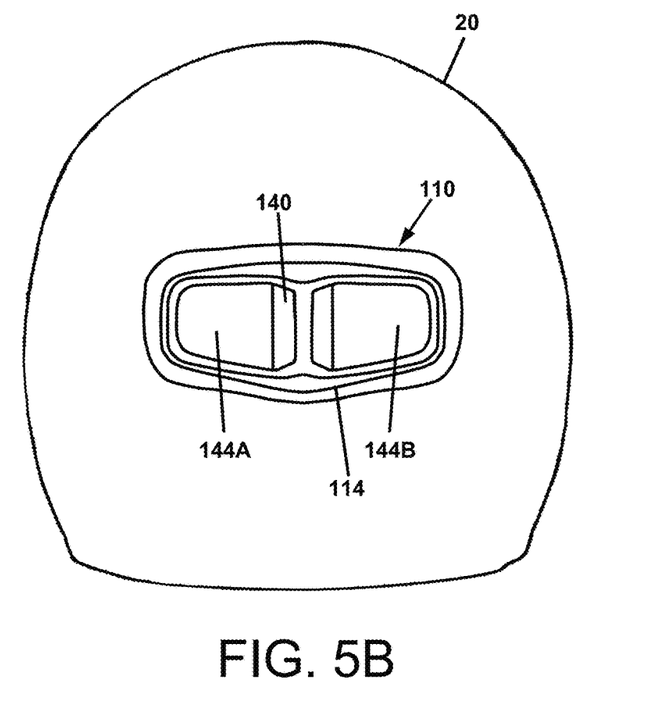
FIG. 5B is a rear elevation view of a safety helmet with the lighting system of the present disclosure mounted in an "upward" or "right side up" position.

The microcontroller 111 is operable to execute an algorithm. The algorithm may include instructions such that when executed, if the signal from the accelerometer 117 is indicative of an upward position of the helmet portion supporting body 114 as shown in FIG. 5B, the microcontroller 111 causes the first helmet signal light 144A to be illuminated when the vehicle left signal light is illuminated, and the microcontroller 111 causes the second helmet signal light 144B to be illuminated when the vehicle right signal light is illuminated. The algorithm may further include instructions such that when executed, if the signal from the accelerometer 117 is indicative of a downward position of the helmet portion supporting body 114 as shown in FIG. 5A, the microcontroller 111 causes the first helmet signal light 144A to be illuminated when the vehicle right signal light is illuminated, and the microcontroller 111 causes the second helmet signal light 144B to be illuminated when the vehicle left signal light is illuminated. The algorithm may include instructions such that when executed, if the signal from the accelerometer 111 is indicative of a downward position of the helmet portion supporting body 114, the algorithm instructs the microcontroller 111 to operate an alarm device, such as an audio speaker 119 of the auxiliary lighting system. The auxiliary lighting system 100 may be further comprised of a helmet transceiver 150 in signal communication with the microcontroller 111, and a vehicle portion 160 comprised of a vehicle transceiver 170 in wireless signal communication with the helmet transceiver 150.

Figure 6:
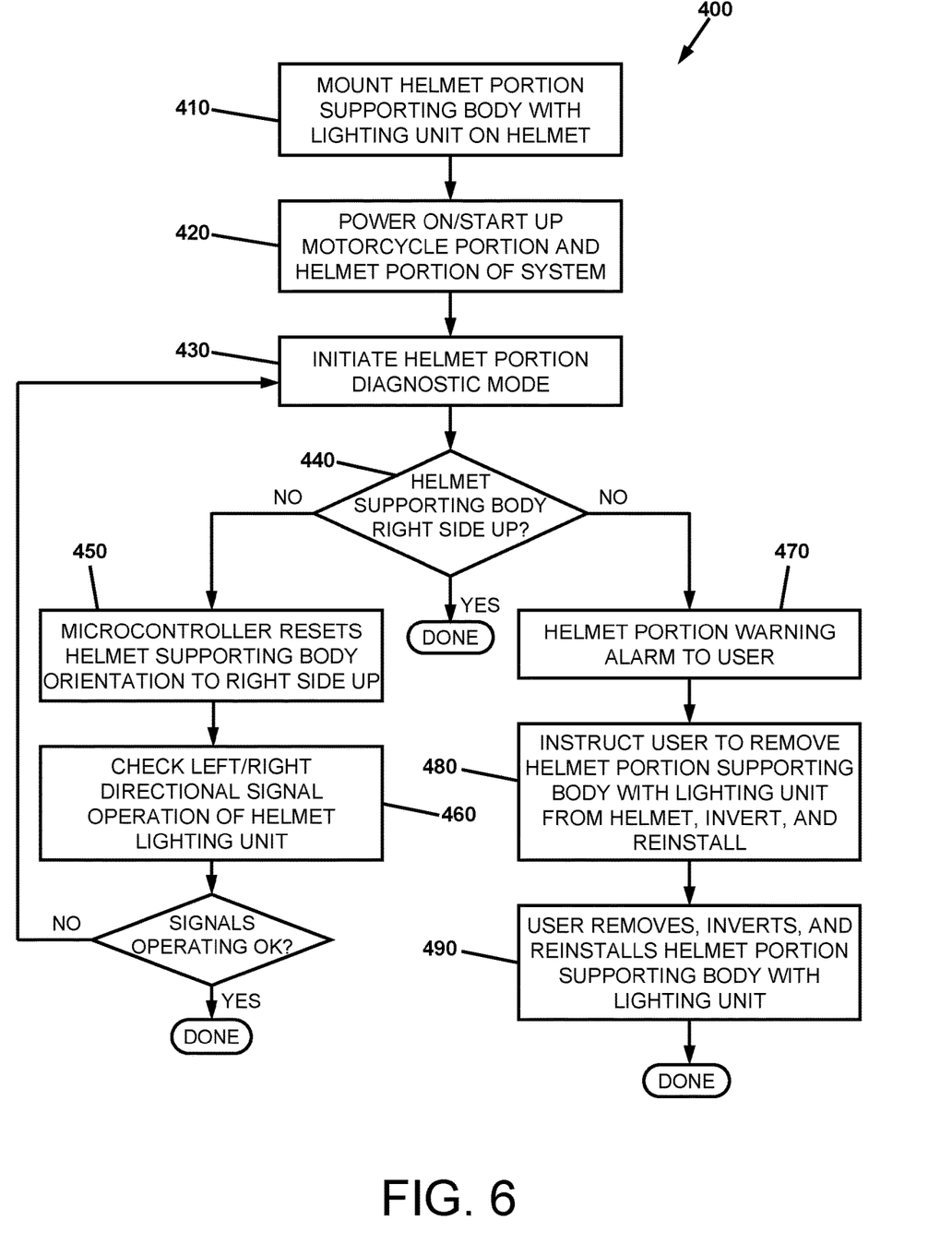
FIG. 6 is a flowchart depicting a method of defining proper left and right turn signal operations of a helmet lighting unit of the lighting system, based upon the orientation of the helmet lighting unit mounted on the helmet.

In another aspect of the present disclosure, a second method of installing the auxiliary lighting system as described above is provided. The system is operable in conjunction with a lighting system of a vehicle comprising a vehicle left signal light and a vehicle right signal light. FIG. 6 is a flowchart depicting a method of defining proper left and right turn signal operations of a helmet lighting unit of such a lighting system 100. The method 400 comprises mounting 410 the helmet portion supporting body 114 with lighting unit 140 on the helmet 20. The mounting 410 may be done and the helmet portion 110 of the system 100 left in place on the helmet 20 between uses by the motorcyclist. However the motorcyclist may have multiple helmets, and desire to move the helmet portion 110 of the system 100 from one helmet 20 to another. Or the helmet portion 110 may need to be removed from the helmet 20 to change batteries. The helmet portion 110 of the system 100 is removably joined to the helmet 20, such as by hook and loop fastener, and is thus easily removed from the helmet 20 and reattached, or moved to another helmet.

The helmet portion 110 of the system 100 may not be particularly distinctive in having an obvious right side up (FIG. 5B) orientation, also referred to herein as an upward position, and an upside down (FIG. 5A) orientation, also referred to herein as a downward position. Thus when a motorcyclist mounts the helmet portion supporting body 114 with helmet lighting unit 140 on the helmet, he will cause a problem if he mounts the helmet portion supporting body 114 with helmet lighting unit 140 upside down as shown in FIG. 5A: when the motorcycle left turn signal 244L is illuminated, the first helmet signal light 144A, which is on the right, will be illuminated, and when the motorcycle right turn signal 244R is illuminated, the first helmet signal light 144B, which is on the left, will be illuminated. This is the opposite of the desired operation.

The lighting system 100 and method 400 of the present disclosure solves this problem. Referring again to FIG. 6, after the helmet portion supporting body 114 with helmet lighting unit 140 is mounted on the helmet 20, electrical power is applied 420 to the helmet portion 110 of the system 100. As part of the startup protocol, the microcontroller 111 initiates 430 a diagnostic check. Based upon a signal from the helmet accelerometer 117, the microcontroller detects 440 if the helmet portion supporting body 114 is in the upward (right side up) or the downward (upside down) position.

If the helmet portion supporting body 114 is detected to be in the upward position as shown in FIG. 5B, that portion of the startup protocol is done. In operation of the system 100, the microcontroller 111 will cause the first helmet signal light 144A on the left to be illuminated when the vehicle left signal light 244L is illuminated and will cause the second helmet signal light 144B on the right to be illuminated when the vehicle right signal light 244R is illuminated. This is the desired operation.

However, if the helmet portion supporting body 114 is detected to be in the downward position as shown in FIG. 5A, the microcontroller 111 will reset the orientation of the helmet portion supporting body 114 as being right side up. This will result in the helmet signal light 144B on the left to be illuminated when the vehicle left signal light 244L is illuminated and the second helmet signal light 144A on the right to be illuminated when the vehicle right signal light 244R is illuminated.

In an alternative variation of the method 400, if the microcontroller 111 detects 440 that the helmet portion supporting body 114 is in the upside down position, the microcontroller 111 may issue an alarm 470, such as a flashing sequence of the brake lights 142 and/or signal lights 144A and 144B, and/or an audible chirp through speaker 119. Such an alarm 470 will be known as instructions 480 for the motorcyclist to remove the helmet portion supporting body 114 with lighting unit 140 from the helmet 20, and to invert, and reinstall it on the helmet 20 as shown in step 490. Upon inversion and reinstallation of the helmet portion 110 on the helmet 20, the flashing of the lights and/or the chirping alarm will be stopped by the microcontroller 111.

It is therefore apparent that there has been provided, in accordance with the present disclosure, auxiliary safety lighting systems for use in conjunction with a vehicle, and methods for operation of the safety lighting system. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom. The following definitions and non-limiting guidelines must be considered in reviewing the description.

The headings in this disclosure (such as "Background" and "Summary") and sub-headings used herein are intended only for general organization of topics within the present technology, and are not intended to limit the disclosure of the present technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof.

To the extent that other references may contain similar information in the Background herein, said statements do not constitute an admission that those references are prior art or have any relevance to the patentability of the technology disclosed herein. Any discussion in the Background is intended merely to provide a general summary of assertions.

The description and specific examples, while indicating embodiments of the technology disclosed herein, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

To the extent employed herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

Unless otherwise specified, relational terms used in the present disclosure should be construed to include certain tolerances that those skilled in the art would recognize as providing equivalent functionality. By way of example, the term perpendicular is not necessarily limited to 90.00°, but also to any variation thereof that those skilled in the art would recognize as providing equivalent functionality for the purposes described for the relevant member or element. Terms such as "about" and "substantially" in the context of configuration relate generally to disposition, location, and/or configuration that is either exact or sufficiently close to the location, disposition, or configuration of the relevant element to preserve operability of the element within the invention while not materially modifying the invention. Similarly, unless specifically specified or clear from its context, numerical values should be construed to include certain tolerances that those skilled in the art would recognize as having negligible importance, as such do not materially change the operability of the invention.

As used herein, the words "comprise," "include," "contain," and variants thereof are intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features. Unless noted otherwise, the auxiliary lighting systems disclosed herein encompass all combinations of the disclosed features thereof, regardless of whether each possible combination of features defining a system has been explicitly recited.

Having thus described the basic concept of the present disclosure, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

What is claimed is:

1. An auxiliary lighting system for a helmet operable in conjunction with a lighting system of a vehicle comprising a vehicle brake light, the auxiliary lighting system comprising:
    a) a microcontroller;
    b) a vehicle portion comprising:
        a vehicle portion supporting body mountable on the vehicle;
        a vehicle transceiver in signal communication with the microcontroller; and
        a vehicle accelerometer joined to the vehicle portion supporting body and in signal communication with the microcontroller, and operable to send a signal indicative of relative position of the vehicle accelerometer with respect to the gravitational field of the Earth;
    wherein the microcontroller is programmed with an algorithm such that when executed, the microcontroller receives the signal indicative of the relative position of the vehicle accelerometer, and determines the performance capability of the vehicle accelerometer in detecting acceleration of the vehicle with respect to the Earth based upon the signal indicative of the position of the vehicle accelerometer; and such that when the vehicle is rotated from the fixed position to an alternative position and the microcontroller receives a signal from the vehicle accelerometer representative of the rotation, based upon that signal, the performance capability of the vehicle accelerometer is improved.

2. A method of installing an auxiliary lighting system operable in conjunction with a lighting system of a vehicle comprising a vehicle brake light, the auxiliary lighting system comprising:
    a microcontroller; and
    a vehicle portion including a vehicle portion supporting body, and a vehicle accelerometer joined to the vehicle portion supporting body and in signal communication with the microcontroller, and operable to send a signal indicative of relative position of the vehicle portion supporting body with respect to the gravitational field of the Earth while the vehicle is in a fixed position; and
the method comprising:
    mounting the vehicle portion supporting body on the vehicle; and
    based upon the signal from the vehicle accelerometer, determining the performance capability of the accelerometer in detecting acceleration of the vehicle with respect to the Earth; and
    rotating the vehicle and the vehicle portion of the system from the fixed position of the vehicle, detecting the rotation of the vehicle with the vehicle accelerometer, delivering a signal representative of the rotation from the accelerometer to the microcontroller, and based upon that signal, improving the performance capability of the accelerometer.

3. An auxiliary lighting system for a helmet operable in conjunction with a lighting system of a vehicle comprised of a vehicle left signal light and a vehicle right signal light, the auxiliary lighting system in signal communication with the vehicle lighting system and comprising a helmet light portion including:
    a) a helmet portion supporting body;
    b) a helmet lighting unit mounted on the helmet portion supporting body and comprised of a first helmet signal light and a second helmet signal light;
    c) a microcontroller in signal communication with the first helmet signal light and the second helmet signal light; and
    d) a helmet accelerometer joined to the helmet portion supporting body and in signal communication with the microcontroller, and operable to send a signal to the microcontroller indicative of a right side up position of the helmet portion supporting body or an upside down position of the helmet portion supporting body relative to the helmet while the helmet is in a fixed position, and while the helmet is in motion;
    wherein the microcontroller is programmed with an algorithm such that when executed, and while the helmet is in the fixed position, if the signal from the accelerometer is indicative of the right side up position of the helmet portion supporting body, the microcontroller causes the first helmet signal light to be illuminated when the vehicle left signal light is illuminated, and the microcontroller causes the second helmet signal light to be illuminated when the vehicle right signal light is illuminated, and if the signal from the accelerometer is indicative of the upside down position of the helmet portion supporting body, the microcontroller causes the first helmet signal light to be illuminated when the vehicle right signal light is illuminated, and the microcontroller causes the second helmet signal light to be illuminated when the vehicle left signal light is illuminated.

4. The auxiliary lighting system of claim 3, wherein the algorithm is such that when executed, and when the helmet is in the fixed position, if the signal from the accelerometer is indicative of the upside down position of the helmet portion supporting body, the algorithm instructs the microcontroller to operate an alarm device of the auxiliary lighting system.

5. The auxiliary lighting system of claim 3, further comprising a helmet transceiver in signal communication with the microcontroller, and a vehicle portion comprised of a vehicle transceiver in wireless signal communication with the helmet transceiver.

6. A method of installing an auxiliary lighting system for a helmet operable in conjunction with a lighting system of a vehicle comprising a vehicle left signal light and a vehicle right signal light, the auxiliary lighting system comprising:

a helmet light portion including a helmet lighting unit comprised of a helmet portion supporting body, a first helmet signal light and a second helmet signal light mounted on the helmet portion supporting body, a microcontroller in signal communication with the first helmet signal light and the second helmet signal light, a helmet transceiver in signal communication with the microcontroller, and a helmet accelerometer joined to the helmet portion supporting body and in signal communication with the microcontroller, and operable to send a signal indicative of a right side up position of the helmet portion supporting body or an upside down position of the helmet portion supporting body relative to the helmet;

the method comprising:
mounting the helmet portion supporting body on the helmet; and
based upon a signal from the helmet accelerometer while the helmet is in a fixed position, detecting if the helmet portion supporting body is in the right side up position or the upside down position.

7. The method of claim 6, wherein if the helmet portion supporting body is detected to be in the right side up position, the method further comprises causing the first helmet signal light to be illuminated when the vehicle left signal light is illuminated and causing the second helmet signal light to be illuminated when the vehicle right signal light is illuminated.

8. The method of claim 6, wherein if the helmet portion supporting body is detected to be in the upside down position, the method further comprises causing the first helmet signal light to be illuminated when the vehicle right signal light is illuminated and causing the second helmet signal light to be illuminated when the vehicle left signal light is illuminated.

9. The method of claim 6, wherein if the helmet portion supporting body is detected to be in the upside down position, the method further comprises operating an alarm device of the auxiliary lighting system.

\* \* \* \* \*